(No Model.)   3 Sheets—Sheet 2.
J. A. PRITCHARD.
PLANTER.
No. 586,867.   Patented July 20, 1897.
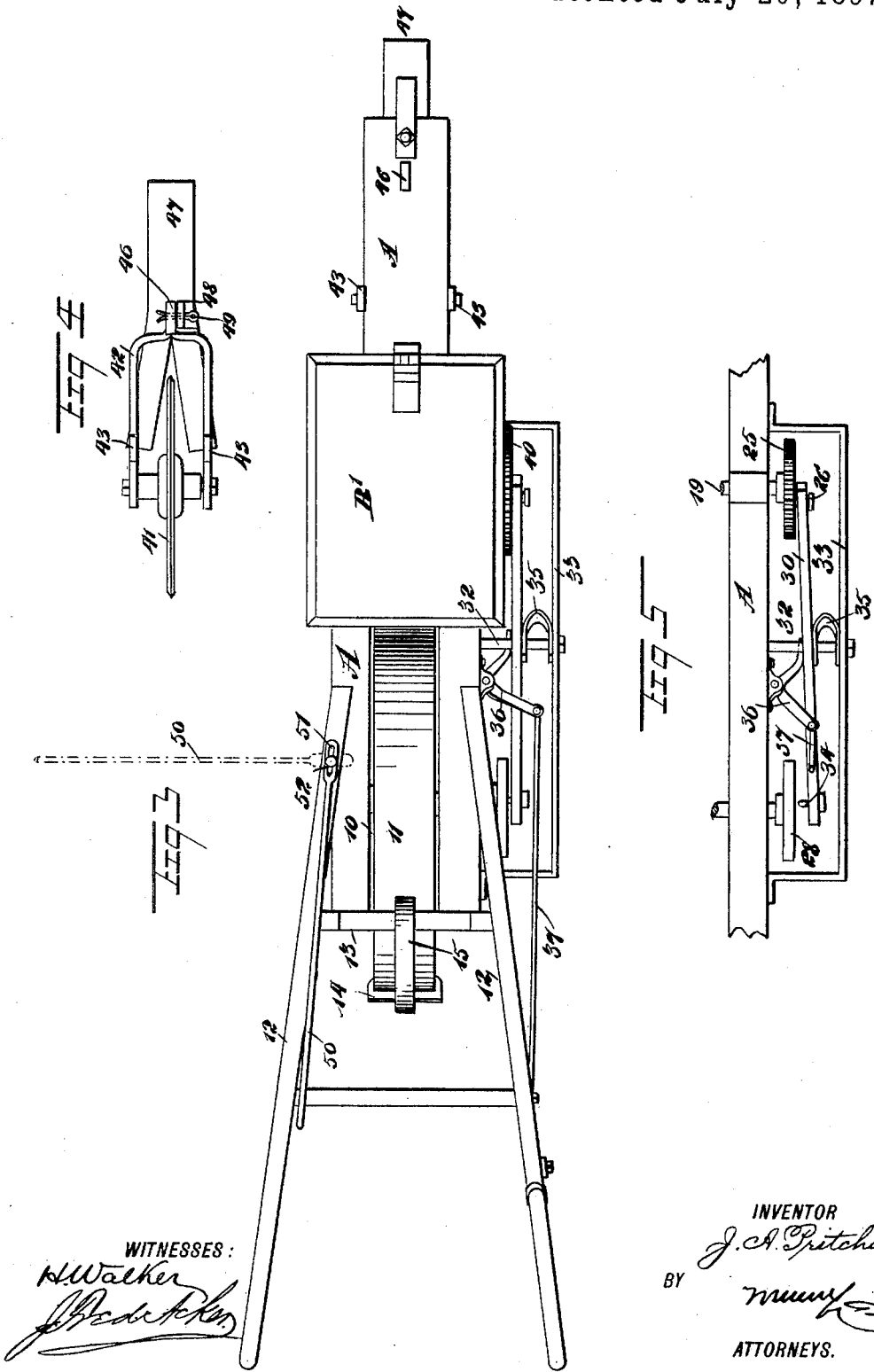
WITNESSES:
H. Walker
INVENTOR
J. A. Pritchard.
BY
ATTORNEYS.

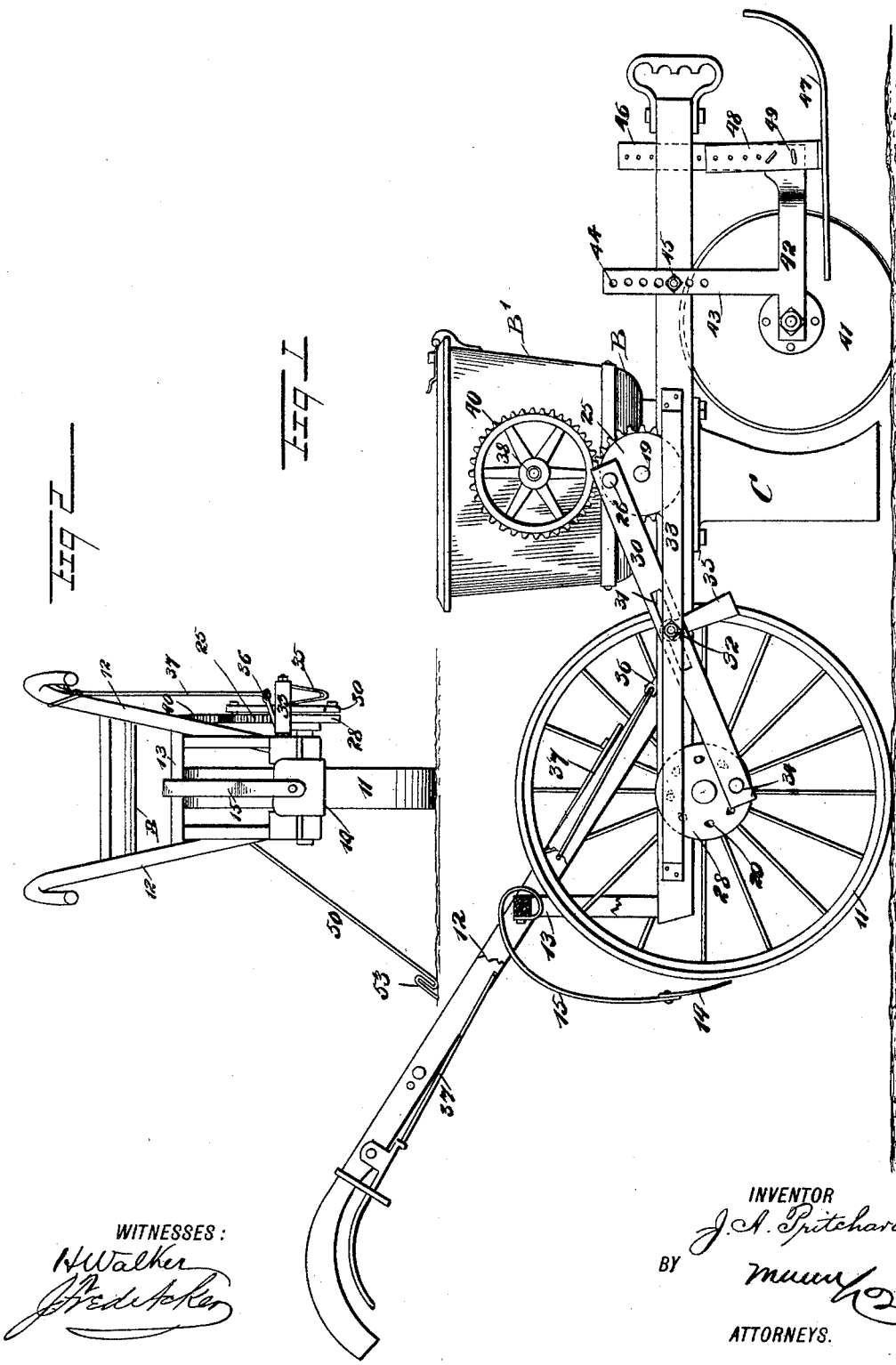

(No Model.) 3 Sheets—Sheet 3.

J. A. PRITCHARD.
PLANTER.

No. 586,867. Patented July 20, 1897.

WITNESSES:
H. Walker
J. Fred Acker

INVENTOR
J. A. Pritchard
BY
Munn
ATTORNEYS.

THE NORRIS PETERS CO., PHOTO-LITHO., WASHINGTON, D. C.

UNITED STATES PATENT OFFICE.

JOSEPH A. PRITCHARD, OF SOUTH MILLS, NORTH CAROLINA.

PLANTER.

SPECIFICATION forming part of Letters Patent No. 586,867, dated July 20, 1897.

Application filed December 2, 1896. Serial No. 614,169. (No model.)

*To all whom it may concern:*

Be it known that I, JOSEPH A. PRITCHARD, of South Mills, in the county of Camden and State of North Carolina, have invented a new and Improved Planter, of which the following is a full, clear, and exact description.

The object of my invention is to construct a planter in which any kind of seed may be used, particularly cotton-seed, and whereby cotton-seeds may be placed in the planter just as they leave the gin and without being rolled.

A further object of the invention is to construct hoppers in such manner that they may be expeditiously applied to the frame of the machine to be used for planting corn or like seed or for planting cotton-seed and to provide a means whereby the driving-wheel of the planter will have its periphery kept clean, and whereby also the boot may be made to travel at any desired depth in the ground and protected from any obstruction calculated to interfere with it.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 6:
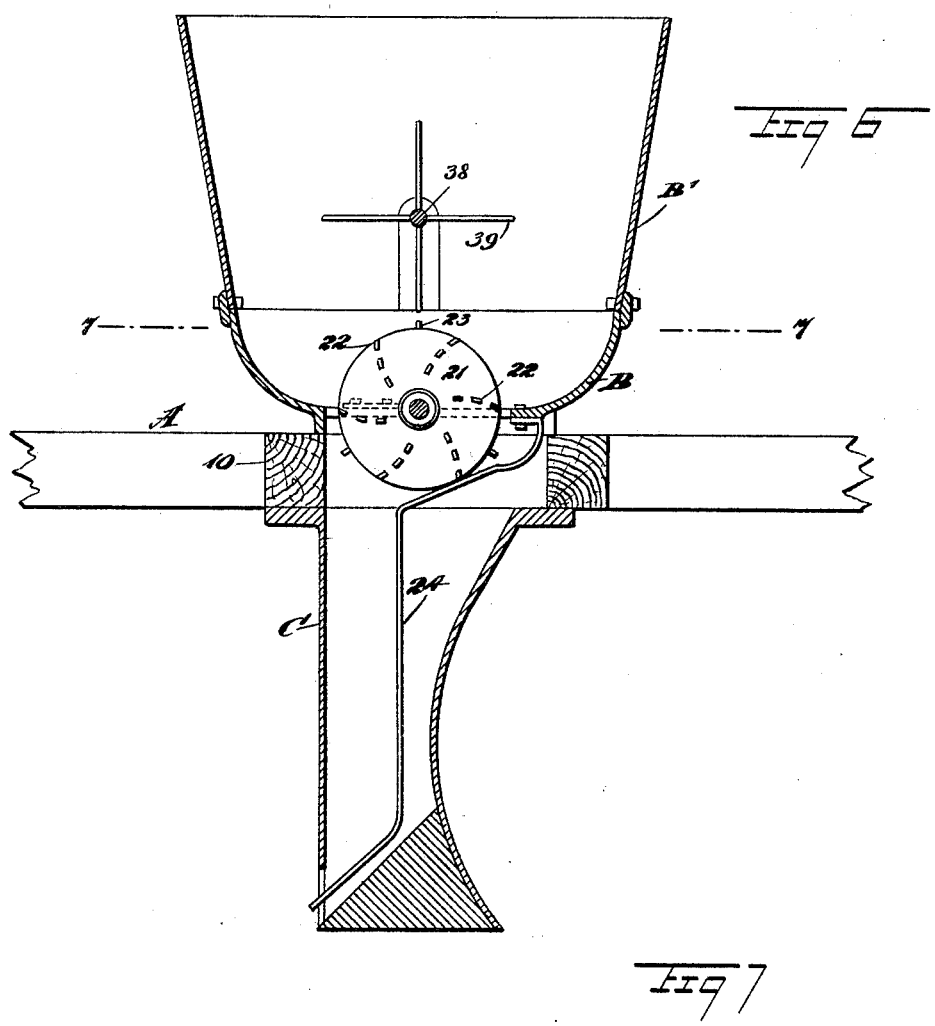
Figure 7:
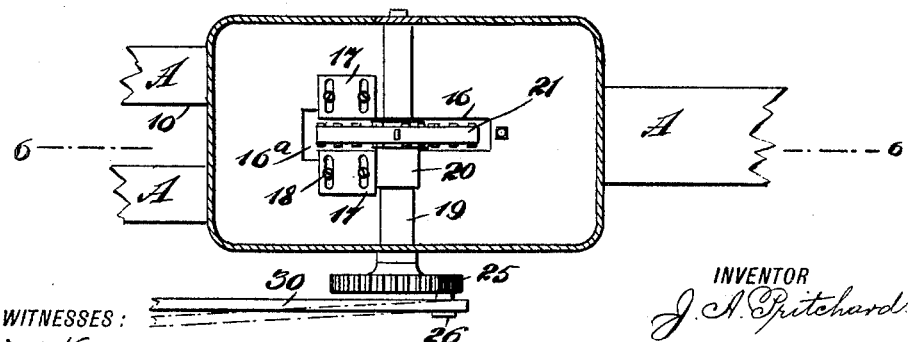

Figure 1 is a side elevation of the improved planter arranged for planting cotton-seed. Fig. 2 is a rear elevation of the planter. Fig. 3 is a plan view. Fig. 4 is a detail plan view of the cutter or colter and fender detached from the machine. Fig. 5 is a detail plan view of the driving mechanism for the seed-distributing wheel. Fig. 6 is a vertical section through the hopper arranged for planting cotton and likewise a vertical section through the body, the section being taken on the line 6 6 of Fig. 7; and Fig. 7 is a horizontal section taken, substantially, on the line 7 7 of Fig. 6.

In carrying out the invention the beam A, which constitutes the main frame of the machine, is provided with a longitudinal opening 10 at the back, and in this opening 10 the supporting-wheel 11 of the machine is located, being journaled in suitable bearings, and the supporting-wheel likewise serves to cover the seed when deposited in the ground.

Handles 12, resembling plow-handles, are secured to the upper rear portion of the beam, and a frame 13 is erected between the handles at the rear of the beam, which frame 13 supports a scraper 14, the said scraper being attached to a spring 15, and this spring is coiled around and attached to the upper cross-bar of the rear frame 13, as is clearly shown in Fig. 1. The spring 15 serves to hold the scraper quite near the periphery of the supporting-wheel 11, so that in the event an unusual quantity of dirt should cling to the tire of the wheel said dirt will be removed by the scraper.

A hopper B is secured upon the beam A in front of the supporting-wheel 11, and the said hopper B is provided with a removable upper section B', as illustrated in Fig. 6. In the bottom of the hopper B a slot 16 is produced, through which the seed is to be carried into the boot C, secured to the bottom of the hopper and to the bottom of the beam. The end 16ª of the slot 16, through which the seed is carried from the hopper into the boot, is wider than the other portion, and the amount of seed that is to be delivered from the hopper into the boot is controlled by means of plates 17, held to slide on the bottom of the hopper, one at each side of the wider portion of the slot 16, as illustrated in Fig. 7, the plates being held in their adjusted position by set-screws 18, which are passed through slots in the plate.

A shaft 19 is journaled in the lower portion of the hopper B, and the shaft crosses the slot 16, being prevented from having lateral movement by a collar 20, which is secured to the hopper. The seed distributing or delivery wheel 21 is secured on the shaft 19, and this wheel is held to turn in the slot 16. The seed-distributing wheel 21 is provided upon both of its side faces with rows of radially-disposed teeth 22, the rows of teeth on one side being located opposite the space between the rows of teeth on the other side of the wheel. Pins 23 are secured in the periphery of the seed-distributing wheel, and as the wheel revolves these pins are arranged to engage with and agitate a spring 24, which extends downward in the boot, and this spring is adapted to prevent the seed from clogging in the boot and to assist in the speedy delivery of the seed to the ground.

At the outer end of the shaft 19 a pinion 25 is secured, the said pinion being provided with a wrist-pin 26. A disk 28 is located at one end of the axle, carrying the supporting-wheel 11, and the said disk is provided with a series of circularly-arranged recesses or openings 29. The disk on the axle of the supporting-wheel is connected with the pinion 25 by means of a lever 30, the lever being pivotally attached to the wrist-pin 26, and the said lever is provided with a longitudinal slot 31 at its center, through which the stud 32 is passed, on which the lever is fulcrumed, the stud 32 being secured to the side portion of the beam A and to a frame 33, erected at the side of the beam, as shown in Figs. 3 and 5. At the rear end of the lever 30 a spur or projection 34 is formed, adapted to enter any one of the openings or recesses 29 in the disk of the supporting-wheel.

A spring 35 is located on the stud 32 and has bearing against the lever 30 and frame 33, the tendency of the spring being to force the spur 34 at the rear end of the lever in position to enter an opening in the disk on the supporting-wheel or to hold the spur in such opening. The lever, however, may be expeditiously and conveniently disengaged from the disk 28, so as to stop the manipulation of the shaft 19, and such a change in the position of the lever is accomplished usually through the medium of a shifting-lever 36, which is shown as fulcrumed on the beam A and as of angular shape, one member bearing against the inner side of the connecting-lever 30 and the other member of the shifting-lever being attached to a rod 37, which is led upward and alongside one of the handles. By simply drawing backward upon the rod 37 the connecting-lever may be drawn out of gear, and the shifting-lever may be held in such position by means of any suitable catch attached to the handle and located at the upper end of the rod.

When such seed as corn, rice, and the like is to be planted, the upper portion B' of the hopper is plain, but when cotton-seed is to be planted the upper portion of the hopper is preferably made to contain an agitating or stirring device. The agitating device is in the nature of a shaft 38, which extends through the hopper from side to side and is provided with any desired number of arms 39. These arms may be of any desired length and may have any desired arrangement on the shaft. At an end of the agitator or stirrer shaft 38 a gear 40 is secured, which meshes with the pinion 25, located on the shaft carrying the seed-distributing wheel. It will thus be observed that by changing the upper section of the hopper the machine may be used for planting different kinds of seed.

In front of the furrow-openers or boot a cutter 41 is located, which is in the nature of a wheel or is shaped as a colter, and this disk cutter is mounted in a bifurcated frame 42, provided with arms 43, extending upward from its sides, the said arms having a series of openings 44 made therein. The arms are located one at each side of the beam in front of the seed box or hopper, and the cutter is raised or lowered by passing a bolt 45 through certain of the apertures 44. The cutter is adapted to destroy any obstacles that may be in the path of the boot and that would be apt to injure it—as, for example, clods of earth, tough grass, and the like—and the cutter will also prevent trash from gathering around the bottom of the boot and will prevent the boot from being brought in engagement with a stump. By adjusting the cutter the depth to which the boot shall enter the ground may be regulated.

At the forward end of the bifurcated frame 42, carrying the cutter, an upright 46 is located. This upright is provided with apertures also and is passed upward through a suitable opening in the beam. A fender 47 is employed in connection with the disk cutter to regulate the depth to which the boot shall enter the ground. This fender is made preferably as shown in Figs. 1 and 4, in which the forward end is upturned and the rear end is bifurcated, the cutter turning in the space between the rear members of the fender. A standard 48 is projected upward from the fender, and this standard is brought in engagement with the forward standard or upright 46 on the cutter-frame, and the fender is adjusted vertically by passing cotter-pins or the like through suitable openings in the standard 48 of the fender and openings in the standard 46, carried by the cutter-frame.

A support 50 is located at one side of the frame of the machine. This support consists, preferably, of a bar having an eye 51 at one of its ends, through which eye a pin 52 is passed ordinarily into one of the handles near where it connects with the body of the frame. The opposite end of the rod is bent upon itself to form a foot, which in the drawings is illustrated as of an S contour, but the foot may be otherwise shaped, if deemed desirable. The object of this bar or support is to serve as a rest for the machine when it is not in operation, as illustrated in Fig. 2, since the form of the machine shown is provided with but a single supporting-wheel, which is in alinement with the boot and with the cutter-wheel.

When the machine is in use, the above-described support 50 may be carried upward and allowed to rest upon the handles, as shown in Fig. 3.

Having thus described my invention, I claim as new and desire to secure by Letters Patent—

1. In a planter, the combination, with a frame, a supporting-wheel journaled in the said frame and provided with a connected disk having openings therein, of a seed-distributing device arranged to have a rotary movement, a connecting-lever connected directly with the said seed-distributing mechanism, the said lever being provided also with a spur to enter the openings in the aforesaid disk, a tension device arranged to normally hold the spur of the connecting-lever in engagement with the said disk, and a shifting device arranged to carry the connecting-lever from an engagement with the disk of the supporting-wheel when the machine is to be thrown out of gear, as and for the purpose specified.

2. In a planter, the combination, with a frame, a supporting-wheel for the frame, provided with an attached disk having openings circularly produced therein, a hopper, a shaft mounted to turn in the said hopper and provided with a seed-distributing cylinder, and a crank-disk attached to one end of the said shaft, of a lever fulcrumed on the frame, having one of its ends attached to the crank-pin of the crank-disk, the opposite end of the lever being provided with a projection arranged to enter the opening in the disk of the supporting-wheel, a tension device acting upon the connecting-lever in a manner to normally hold its projection in engagement with the said disk, and means, substantially as described, for carrying the connecting-lever away from the apertured disk, as and for the purpose specified.

3. In a planter, the combination of dropping mechanism, a drive-wheel, a disk driven by the drive-wheel and having orifices therein, a lever connected with the dropping mechanism and having a pin capable of being seated in any of the openings in the disk, a spring pressing the lever toward the disk, and shifting mechanism connected with the lever and by which the lever may be moved to disengage the disk, substantially as described.

4. In a planter, the combination of dropping mechanism, a driven wheel with openings therein, a lever in connection with the driving mechanism and having a pin capable of removably fitting within the openings of the said driven wheel, and a spring pressing the lever toward the driven wheel, substantially as described.

5. The combination of a driven rotary member with a plurality of differentially-located openings, a lever having a pin capable of removably fitting within the openings, and dropping mechanism in connection with the lever, substantially as described.

6. The combination of a lever movable axially, a driven rotary member with which the lever may have removable connection, and a spring pressing the lever in an axial direction and toward the driven rotary member, substantially as described.

7. The combination of a lever having axial movement, a driving member with which the lever may have removable connection, and means for yieldingly holding the lever in engagement with the driving member, substantially as described.

8. In a planter, the combination of a hopper, a boot below and communicating with the hopper, a spring-tongue running longitudinally through the boot, and a distributing-wheel mounted at the upper portion of the boot and engaging the spring-tongue, the distributing-wheel serving to pass the seed from the hopper to the boot and to vibrate the tongue within the boot, substantially as described.

9. A planter having a seed-boot, a movable tongue extending longitudinally through the boot and having its free end projecting to the discharge-orifice of the boot, and means for vibrating the tongue within the boot, substantially as described.

10. A planter having a boot, a seed-hopper above the boot and communicating therewith, a spring-tongue extending longitudinally in the boot and having its free end projected to the discharge-orifices of the boot, and a distributing-wheel mounted at the upper portion of the boot and serving to pass the seed from the hopper to the boot and also to vibrate the tongue within the boot, substantially as described.

11. A planter having a beam, a frame connected to the beam, a rotary colter carried by the frame, a fender located forwardly of the colter and having its front end curved upward and its rear end bifurcated to embrace the colter, and a standard attached to the fender and to the colter-frame, substantially as described.

12. A planter having a beam, a colter-frame connected with the beam, a colter carried by the colter-frame, and a fender located forward of the colter and carried by the colter-frame, the rear end of the fender being bifurcated to embrace the colter, substantially as described.

13. A planter having a beam, a colter-frame carried at the forward portion of the beam and beneath the same and being elongated longitudinally therewith, a colter carried at the rear portion of the frame, and a fender carried at the forward portion of the frame and being bifurcated at its rear end to embrace the colter, substantially as described.

JOSEPH A. PRITCHARD.

Witnesses:
  C. H. SPENCER,
  G. F. SPENCER.